United States Patent [19]

Heyes et al.

[11] Patent Number: 4,917,260

[45] Date of Patent: Apr. 17, 1990

[54] METAL CAN ENDS WITH PLASTICS CLOSURES

[75] Inventors: Peter J. Heyes, Wantage; Nicholas J. Middleton, Highworth, both of England

[73] Assignee: CMB Packaging (UK) Limited, Woodside, England

[21] Appl. No.: 378,211

[22] PCT Filed: Oct. 12, 1988

[86] PCT No.: PCT/GB88/00847

§ 371 Date: Jun. 9, 1989

§ 102(e) Date: Jun. 9, 1989

[87] PCT Pub. No.: WO89/03349

PCT Pub. Date: Apr. 20, 1989

[30] Foreign Application Priority Data

Oct. 15, 1987 [GB] United Kingdom ............... 8724245

[51] Int. Cl.4 ............................................. B65D 17/34
[52] U.S. Cl. ..................... 220/270; 220/269; 220/458; 428/35.8
[58] Field of Search ............ 220/269, 270, 450, 456, 220/457, 458; 428/35.8, 458

[56] References Cited

U.S. PATENT DOCUMENTS

| 3,108,709 | 10/1963 | Bosmajian | 220/458 |
|---|---|---|---|
| 3,268,620 | 8/1966 | Tarwid | 220/458 |
| 3,367,901 | 2/1968 | Wilmington | 220/458 |
| 3,952,911 | 4/1976 | Bozek et al. | 220/269 |
| 3,967,749 | 7/1976 | Walter | 220/269 |
| 4,143,790 | 3/1979 | Ueno et al. | 428/35.8 |
| 4,283,428 | 8/1981 | Birkmeyer | 220/458 |
| 4,304,804 | 12/1981 | Fitko | 428/35.8 |
| 4,452,374 | 6/1984 | Hitchcock et al. | 220/458 |
| 4,500,011 | 2/1985 | Brochman | 220/270 |
| 4,577,777 | 3/1986 | Brochman | 220/270 |
| 4,595,116 | 6/1986 | Carlsson | 220/270 |
| 4,674,649 | 6/1987 | Pavely | 220/270 |
| 4,813,837 | 3/1989 | Ball et al. | 220/270 |

Primary Examiner—David T. Fidei
Attorney, Agent, or Firm—Burns, Doane, Swecker & Mathis

[57] ABSTRACT

A metal can end with a one-piece tear-open closure of a polymeric material (e.g. a polyolefin or polyamide) moulded thereon so as to fill an aperture therein and to form a rim surrounding the aperture on the underside and a pull tab lying against the upper side of the can end, wherein the underside of the can end has a coating of a polymeric material bonded to the polymeric material of the rim and the upper side has a coating whose outer surface is of a different polymeric material which will not bond to the polymeric material of the closure, the materials of the coatings being chosen to be capable of being laminated simultaneously to the metal of the can end, e.g. by the use of bonding resins such as an acid-modified polyolefin resin.

18 Claims, 4 Drawing Sheets

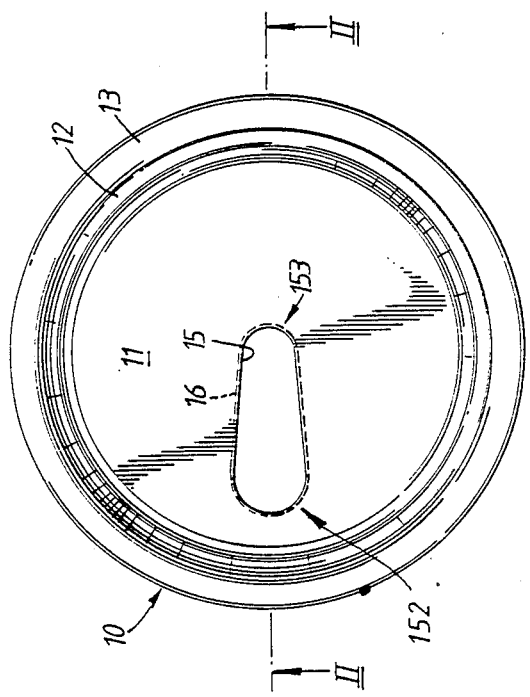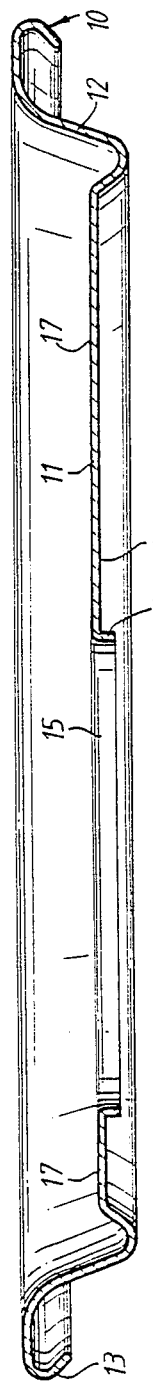

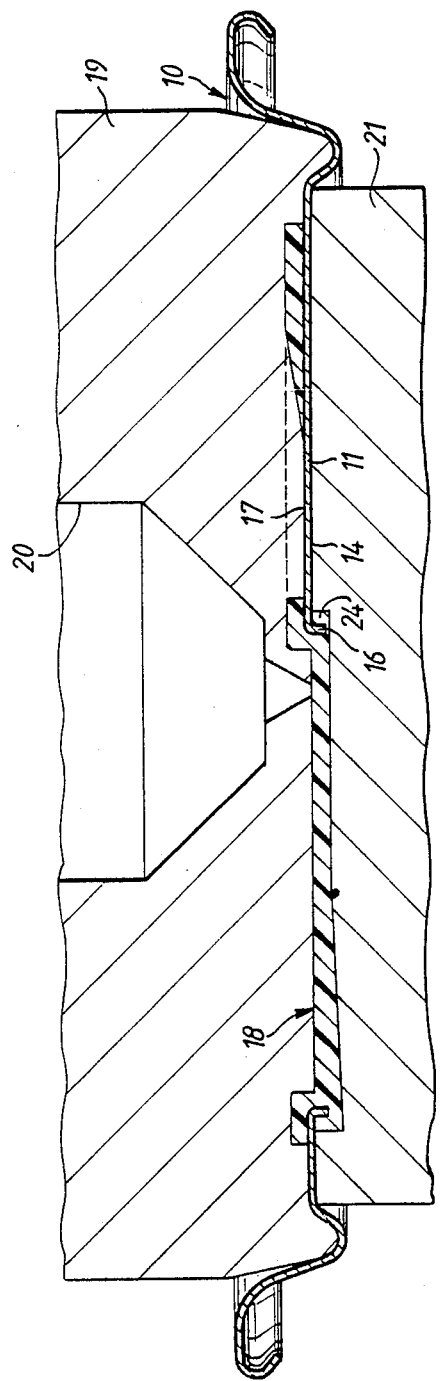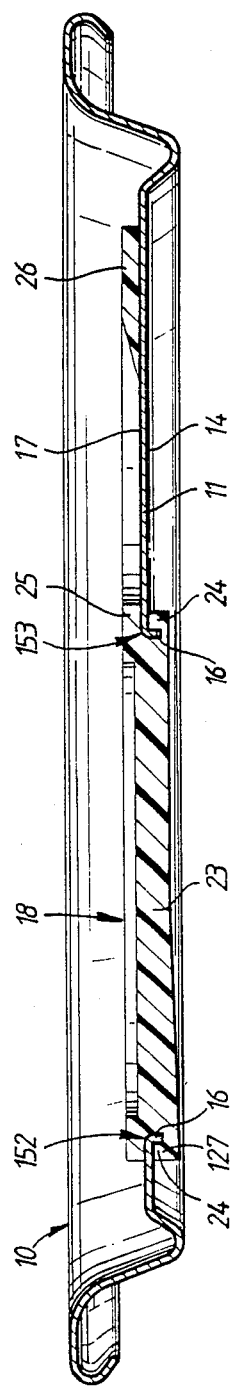

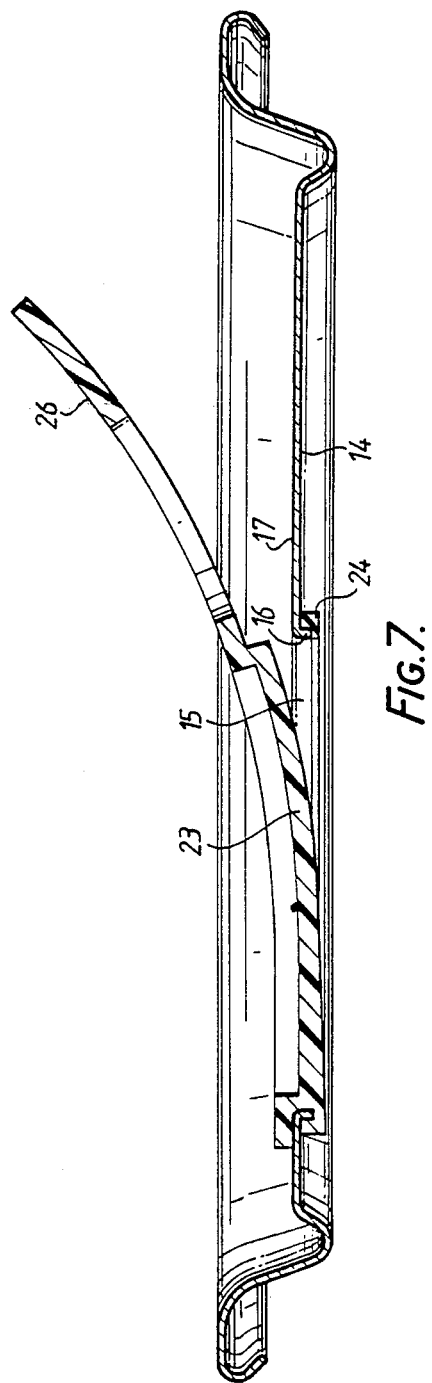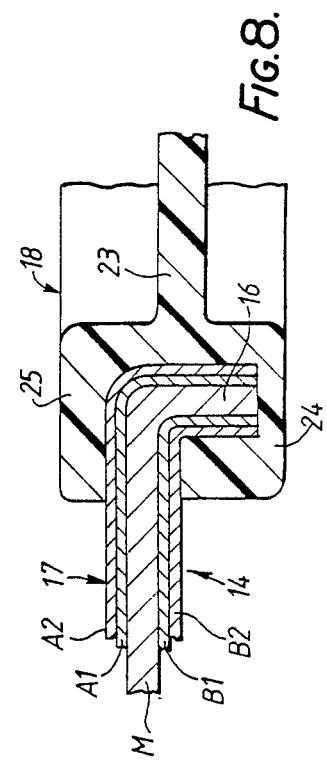

METAL CAN ENDS WITH PLASTICS CLOSURES

FIELD

This invention relates to metal can ends with plastics closures.

BACKGROUND

In our British Patent Specifications Nos. 2180520A and 2180521A, we have described metal can ends, having a central panel with an aperture therein and a one-piece tear-open plastics closure of a polyolefin material (e.g., polypropylene or polyethylene) moulded, e.g. by injection moulding, on to the central panel, the plastics closure comprising a plug part filling the aperture, a rim surrounding the aperture on both upper and under sides of the central panel and a pull tab joined laterally to the plug part and lying against the upper side of the central panel, the can end being provided on its under side with a coating of a similar material to that of the closure to facilitate bonding.

It would be advantageous to provide the upper side of the can end with a similar coating to protect the metal from corrosion and from the effects of double seaming the can end to a can body, but this is not practicable since the pull tab and the rim surrounding the aperture on the upper side of the can end would then bond to the can end during the moulding process and it would be impossible to lift the tab and open the closure.

It is known to apply coatings of polymers of differing characteristics to opposite sides of a metal sheet in separate sequential lamination steps, but the different thermal conditions required have previously made it impossible to achieve simultaneous lamination of different polymers having the desired characteristics for the present application.

In our copening British Patent Application No. 8724237 of 15th October 1987 we have described how simultaneous thermal lamination of films of different polymers to opposite sides of a metal sheet can be achieved by matching the softening characteristics of the different polymers.

SUMMARY

According to the present invention, there is provided a metal can end having a central panel with an aperture therein and a one-piece tear-open closure of a polymeric material moulded on to the central panel, the plastics closure comprising a plug part filling the aperture, a rim surrounding the aperture at least on the under side of the central panel and a pull tab joined laterally to the plug part and lying against the upper side of the central panel, wherein the can end is provided on its under side with a coating of a polymeric material bonded to the polymeric material of the rim of the closure and is provided on its upper side with a coating whose outer surface is of a different polymeric material chosen so as not to bond with the polymeric material of the closure but to be capable of being laminated in film form to the metal sheet simultaneously with the polymeric material of the coating on the under side, and to protect the metal of the can end from corrosion and from the effects of double seaming the can end to a can body.

The can ends can thus be made from metal sheet which has been simultaneously laminated with films of the two different polymeric materials to form the coatings on the under side and the upper side, with a considerable resultant saving in costs as compared with sequential lamination, and with the realisation of the desired protection of the metal of the can end and non-adhesion to the closure, permitting easy opening.

In the description which follows, relating to the embodiments of the invention which employ a composite polyester or polyolefin based film as the coating on the upper side of the can end, that coating will be referred to as A, while the film which forms the coating on the under side will be referred to as B.

The closure may be of a polyolefin or a polyamide and the coating (B) on the under side may be a single layer film of a bonding resin which is an acid-modified polyolefin resin containing carboxyl or anhydride groups.

Preferably the closure is of a polyolefin or a polyamide and the coating (B) on the under side is a composite film comprising an inner layer (B1) of a bonding resin which is an acid-modified polyolefin resin containing carboxyl or anhydride groups and an outer layer (B2) of a polyolefin or a polyamide or an acid-modified polyolefin adhered to the inner layer (B1). The closure and the outer layer (B2) may be of polypropylene, polyethylene or an ethylene-propylene copolymer. Alternatively, the closure may be of nylon and the outer layer (B2) may be of nylon or an acid-modified polyolefin. The coating (A) on the upper side of the can end is preferably a composite polyester film comprising an inner layer (A1) of a substantially non-crystalline linear polyester having a softening point below 150° C. and a melting point above 150° C. but below 240° C. and an outer layer (A2) of a linear polyester having a melting point above 220° C. With this combination of coatings on the under and upper sides, the softening characteristics of the two films are matched to such an extent that simultaneous lamination is possible. The excellent characteristics of the linear polyester of the outer layer of the coating on the upper side, which may be biaxially oriented polyethylene terephthalate for example, can be retained during lamination and employed in the can end of the invention.

The composite polyester film (A) is suitable for use with both polyolefin and polyamide closures.

Alternatively, the coating (A) on the upper side of the can end may be a composite film comprising an inner layer (A1) of a bonding resin which is an acid-modified polyolefin resin containing carboxyl or anhydride groups and an outer layer (A2) of a polymer which does not bond with the polyolefin or polyamide material of the closure. Again the matching of the softening characteristics enables simultaneous lamination to be achieved with the desired characteristics of the outer layer.

For some particular applications e.g. when it is desired to pigment the upper side coating (A), preferably a layer of polyolefin (A2) overlies the inner layer (A1) of bonding resin and a further layer of bonding resin (A3) is interposed between said polyolefin layer and an outer layer (A4). The polymer of the outer layer (A4) may be a polyamide, polymethylpentene or a polycarbonate, the particular resin selected being one that will not bond directly to the material of the closure. White pigment, when used, may be for example titanium dioxide at a concentration of 2 to 30% by weight in the polyolefin layer (A2) and 0 to 15% in the outer layer (A4). It is also advantageous to use an anti-blocking agent such as synthetic silica of particle size between 0.5 and 5 micron in the outer layer (A4) at a concentration of 0.1 to 1%.

Coloured pigments may be used instead of titanium dioxide to give an attractive outward appearance to the can end. Generally such materials are well known and can be added to the polyolefin or polyamide resin as a master batch. The master batch preferably has a high pigment content and a resin base compatible with the polymer used in the coating.

As a further alternative, where the upper side coating (A) is a composite film comprising an inner layer (A1) of a bonding resin as described above, the outer layer (A2) may be polypropylene which has been subjected to corona treatment and then covered by a liquid-applied coating which does not bond with the polyolefin or polyamide material of the closure. The liquid-applied coating may be of, for example, polyvinylidene-chloride, nitrocellulose or an acrylic lacquer. In such composite films it is generally necessary to corona treat the polypropylene film in the extrusion line and to a surface energy of approximately 40 dynes.

The metal of the can end may be aluminum, in accordance with general practice. The protection afforded by the coatings applied to both the upper side and under side of the can end, however, make it possible to employ steel can ends, e.g. of electrolytically chromium coated steel or low tin tinplate typically tin plate with a tin coating weight below 2.8 grams per square meter, without meeting the problems previously encountered with steel can ends, namely external corrosion and damage in double seaming and ingress of iron into the product in the can. Use of steel can ends is advantageous from the point of view of material recycling of use or scrap steel-bodied cans. Similarly aluminium ends are environmentally advantageous for aluminium can bodies. The coating on the upper side of the can end provides a surface which is acceptable to the consumer for direct drinking from the can. The upper side coating may be coloured, white or decorated by printing to produce a visually attractive impression or convey information.

The composite polyester film (A) is preferably one which has been prepared by co-extrusion prior to application to the metal strip. The composite polyester film (A) comprises a thinner inner layer (A1) of an essentially amorphous linear polyester which has a softening point below 150° C. and a melting point above 150° C. but below 240° C. and a thicker outer layer (A2) having a melting point above 220° C., and preferably having an intrinsic viscosity of from 0.5 to 1.1, preferably 0.6 to 0.8.

Preferably the outer layer (A2) is biaxially oriented polyester such as polyethylene terephthalate. Preferably the inner layer (A1) is a linear copolyester, for example an amorphous copolymer of approximately 80 mole % ethylene terephthalate and approximately 20 mole % ethyleneisophthalate. Copolyesters of terephthalic acid and two alcohols, for example ethylene glycol and cyclohexane-dimethanol, are also suitable for use as the inner layer (A1).

Typically, the biaxially oriented polyester in outer layer (A2) has a crystallinity greater than 30%, preferably from 40 to 50%.

The crystallinity of a polyester material can be estimated by X-ray diffraction techniques as described in GB 1566422 or from measurement of density and applying the relationship:

$$V_c = (P - P_a)(P_c - P_a)^{-1}$$

$V_c$ = Volume fraction crystallinity

P = density of sample
$P_a$ = density of amorphous material
$P_c$ = density of crystalline material P can be measured in a density column using zinc chloride/water or n-heptane/carbon tetrachloride mixtures.

The biaxially oriented film which may be used as the outer layer (A2) on the upper side of the can end may be formed by stretching the amorphous extruded polymer in the forward direction at temperatures above the glass transition temperature of the polymer by a factor of 2.2 to 3.8 and similarly in the transverse direction by 2.2 to 4.2.

Typically the inner layer (A1) should be continuous and have a typical thickness of about 2 to 5 microns. The ratio of the thickness of the outer polyester layer (A2) is typically 10 to 25 microns and the total film thickness 12 to 30 microns.

If desired, the polyester layers may contain inorganic anti-blocking agents such as synthetic silica having an average particle size of from 0.5 and 5 microns.

Also, if desired, the outer polyester layer (A2) may be pigmented using conventional pigments such as titanium dioxide and toning pigments to produce either a coloured film or an acceptably white film.

The principal function of the inner polyester layer (A1) is to heat seal to the metal surface at temperatures below the melting point of the outer polyester layer (A2). It is important that the inner layer should retain its amorphous nature after orientation and heat setting of the film. Furthermore the inner polyester layer (A1) should bond to the metal at temperatures which are compatible with the simultaneous lamination to the opposite side of the metal sheet of a polyamide or polyolefin containing coating (B). This requirement is met by ensuring that the inner layer of polyester (A1) has a softening point compatible with the temperatures needed to laminate a wide range of polyolefin or polyamide based coatings. For this purpose the softening point should be lower than 150° C., typically not greater than 130° C.

While the preferred polyolefin in the outer layer (B2) on the underside of the can end is polypropylene, or polyethylene, or an ethylene-propylene copolymer, other polyolefins such as polymethyl pentene may be used. Where a polyamide is used in the outer layer (B2), Nylon 6 is a preferred material.

The bonding resin layer (B1) in the composite film (B) is an acid-modified polyolefin resin containing carboxyl or anhydride groups. Typical acids for use in preparing such acid-modified polymers are ethylenically unsaturated carboxylic acids such as acrylic acid, methacrylic acid, maleic acid, fumaric acid, crotonic acid, and itaconic acid. Typical anhydrides used for the same purpose are ethylenically unsaturated carboxylic anhydrides such as maleic anhydride.

The acid groups can be present as copolymers of ethylene, for example ethylene/acrylic acid (EAA) or ethylene/methacrylic acid (EMAA). Typically the acid concentration is 5 to 15%.

The acid modification of the acid modified polymers can be obtained, for example, by grafting maleic anhydride to a polyolefin such as polypropylene, polyethylene, ethylene-propylene or ethylene-vinylacetate copolymer. The graft can be introduced by techniques such as reacting maleic anhydride with polyolefin in solution in an organic solvent and using a free radical catalyst such as dibenzoyl peroxide or dicumyl peroxide. Alternatively, an active centre can be introduced into the polymer by using high energy radiation such as gamma rays or X-rays and then reacting the resultant material with the anhydride.

The anhydride graft-modified polyolefin can be diluted with further unmodified polyolefin to produce a bonding resin. The bonding resin preferably contains 0.05% to 0.5%, more preferably 0.1% to 0.25% acid modification, measured by analysis of infra red adsorption at 1790 cm$^{-1}$, of resin pre-dried at 200° C. to convert acid functionality to anhydride functionality. The diluting unmodified polyolefin can be the same polyolefin which has been used to produce the acid modified polyolefin, or it can be a different polyolefin. Thus, for example, an acid modified linear low-density polyethylene (LLDPE) can be diluted with polypropylene, or an acid modified polypropylene can be diluted with a polypropylene or an ethylene propylene random copolymer.

The purpose of the inner layer (B1) of bonding resin is to tie the outer layer (B2) of polyolefin or polyamide to the metal surface. Preferably when the outer polyolefin layer (B2) is a polyethylene, the bonding resin base of the inner tie layer (B1) is a polyethylene or ethylene copolymer. Preferably when the outer polyolefin layer (B2) is a polypropylene homopolymer or an ethylene-propylene copolymer, the bonding resin base of inner tie layer (B1) is a polypropylene or an ethylene propylene random copolymer. When the outer layer (B2) is a polyamide, the bonding resin layer can be based on a polyethylene or a polypropylene, or an ethylene copolymer.

Preferably, for a bonding resin layer based on polypropylene, the bonding resin melt flow index is 3 to 30 gm/10 minutes, measured at 230° C. by the ASTM test No. D1238.

Particularly preferred bonding resin layers are based on random ethylene-propylene copolymers or blends of linear low-density polyethylene (LLDPE) with polypropylene.

A particularly preferred acid modified olefin copolymer is maleic-anhydride modified ethylene vinyl acetate.

The layer of bonding resin (B1) in a composite polymer film (B) is preferably continuous and of a thickness of from 1 to 10 microns.

In a further embodiment of the present invention, a further polyamide or polyolefin layer (B4) may be adhered to the outer layer (B2) by means of a further bonding resin layer (B3), the said bonding resin layer (B3) being as defined above for bonding resin layer (B1). If desired, any of layers (B1) to (B4) may be pigmented in conventional manner, with titanium dioxide for example. The preferred arrangement is for pigment to be in layer (B2) or in layers (B2) and (B4). Preferably the outer polyolefin or polyamide layer may contain inorganic anti-blocking agents such as synthetic silica having a particle size of from 0.5 to 5 microns.

THE DRAWINGS

Throughout this specification, intrinsic viscosities are measured at 25° C. in O-chlorophenol solutions at a concentration of 5 g/l.

Specific embodiments of the invention will now be described in more detail by way of example and with reference to the accompanying drawings, in which:

FIG. 1 is a plan view of a metal can end with an aperture in its central panel, before application of a closure thereto, FIG. 2 is a cross-section to a larger scale on the line II—II of FIG. 1, FIG. 3 is a diagrammatic cross-section showing the injection moulding of a closure on to the can end of FIGS. 1 and 2, FIG. 4 is a cross-section similar to FIG. 2 but showing the closure in place, FIG. 5 is a plan view of the can end with closure, FIG. 6 is a cross-section similar to FIGS. 2 and 4, showing lifting of the pull tab prior to opening of the closure.

FIG. 7 is a similar view showing opening of the closure, and

FIG. 8 is a scrap sectional view adjacent one end of the aperture, illustrating diagramatically the coatings on the can end.

DETAILED DESCRIPTION

Figure 5:
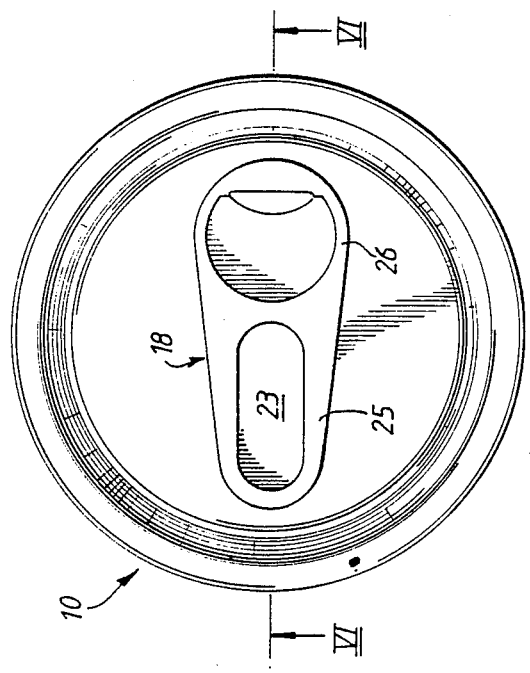

The can end 10 shown in the accompanying drawings is of metal, such as electrolytically chromium coated steel (ECCS), low tin tinplate or aluminium. It has a central panel 11 with an outwardly flared raised edge portion 12 and a curved periphery 13 for double-seaming to a can side wall (not shown). The central panel 11 is pierced to form an aperture 15 with a down-turned flange 16 around its periphery. The aperture 15 is pear-shaped, having a pouring end 152 of larger radius than the opposite or venting end 153. The can end is formed from a metal sheet which has been simultaneously laminated with a film (B) of a polyolefin-based material forming a coating 14 on the underside of the can end and with a film (A) whose outer surface is of a different polymeric material forming a coating 17 on the upper side of the can end, as described in more detail below.

Figure 6:
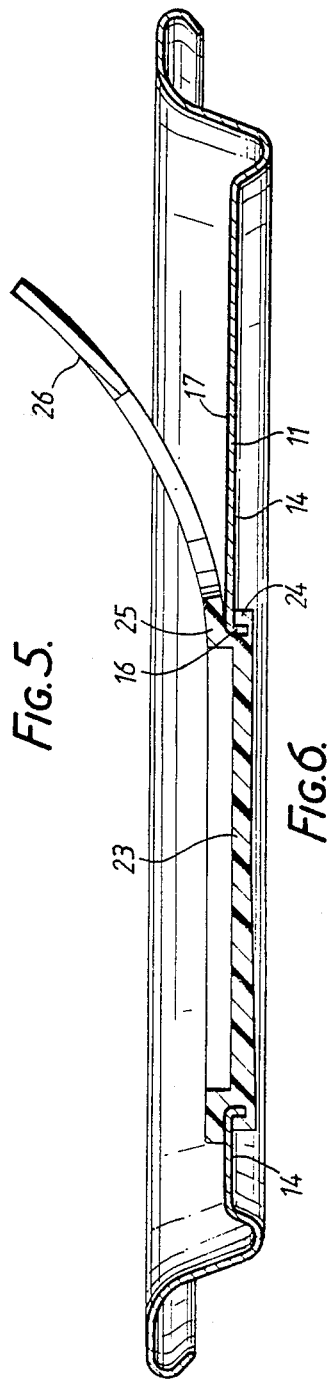

As shown in FIG. 3, a one-piece tear-open plastics closure 18 is injection moulded on to the can end 10 by placing the can end between a top mould 19 having an injection passage 20 and a steel bottom mould 21 and injecting molten polyolefin or polyamide material through the passage 20 to form the closure 18. The closure is more clearly illustrated in FIGS. 4 and 5 and comprises a plug part 23 filling the aperture 15, a rim 24 surrounding the aperture 15 on the under side of the central panel 11, a further rim part 25 surrounding the plug part 23 on the upper side of the central panel and a pull tab 26 joined laterally to the plug part 23 and lying against the upper side of the central panel 11. The rim 24 of the closure is bonded to the polyolefin based or polyamide material of the coating 14 on the under side of the can end, but the rim 25 and the pull tab 26 are not bonded to the polymeric material of the coating 17 on the upper side of the can end. As a result, when the closure is to be opened, the pull tab 26 can be lifted as shown in FIG. 6 away from the panel 11 and the closure can be opened as shown in FIG. 7 by tearing the plug portion 23 away from the inner rim 24 by a shearing action against the flange 16. The thickness of the plug portion 23 is increased towards the pouring end 152 of the aperture, so that the residual thickness 127 below the flange 16 is increased in this region, in order to provide increased resistance to creep.

In general, as illustrated in FIG. 8, the coatings 14 and 17 are composite films A and B laminated simultaneously to the metal M of the can end. They may be two-layer films as shown, consisting of inner layers (A1), (B1) of bonding resin in contact with the metal and outer layers (A2), (B2). Where the outer layer (A)

is to be pigmented, it may comprise further layers (A3), (A4) as described above but not illustrated in FIG. 8.

The following table sets out various possible combinations of materials which may be used in accordance with the present invention:

| LAYERS | | | | | | |
|---|---|---|---|---|---|---|
| A2 | PET | PET | PET White or Coloured | PET | PET | Polypropylene Clear, white or coloured |
| A1 | Modified PET | Modified PET | Modified PET | Modified PET | Modified PET | Modified Polypropylene |
| M | TP ECCS Steel | TP ECCS Steel | TP ECCS Steel | Aluminum or Al Alloy | Aluminum or ECCS | Aluminum or ECCS |
| B1 | EAA, EMAA or Maleic Anhydride modified Polyethylene | Maleic Anhydride modified Polypropylene | Maleic Anhydride modified Polypropylene | Maleic Anhydride modified Polypropylene | EAA, EMAA or MA Modified PE or PP | EAA, EMAA or MA Modified Polypropylene |
| B2 | Polyethylene | Polypropylene | Nylon | Polypropylene | | Nylon |
| Closure | Polyethylene | Polypropylene | Nylon | Polypropylene | Nylon | Nylon |

| LAYERS | | | | |
|---|---|---|---|---|
| A2 | PP Clear, white or coloured | Polymethyl Pentene | Lacquered PP Clear, white or coloured | PET |
| A1 | MA Modified PP | MA Modified PP | MA Modified PP | Modified PET |
| M | TP ECCS Steel or Al | TP ECCS Steel or Al | TP ECCS Steel or Al | TP ECCS Steel or Al |
| B1 | Modified PET | MA Modified PP | MA Modified PP | MA Modified PP |
| B2 | PET | PP | PP | — |
| Closure | PET | PP | PP | PP |

In this table, PET indicates polyethylene terephthalate, modified PET indicates a bonding resin formed of a noncrystalline linear polyester as described above, PE indicates polyethylene, PP indicates polypropylene, modified polypropylene indicates a bonding resin formed of a graft-modified polypropylene as described above, EAA indicates ethylene acrylic acid, EMAA indicates ethylene methacrylic acid, MA indicates maleic anhydride. TP indicates tinplate, and ECCS electrolytically chromium coated steel.

In a specific example (1), the material of the closure 18 was polypropylene and the coating on the underside of the can end was a composite film comprising a layer (B1) 3 microns thick of a bonding resin consisting of a maleic anhydride graft modified ethylene-propylene random copolymer having graft levels of about 0.2+0.05 and an outer layer (B2) 37 microns thick of polypropylene adhered to the bonding resin. The metal of the can end was electrolytically chromium coated steel (ECCS) and the coating 17 on the upper side of the can end was a composite polyester film comprising an inner layer (A1) 3 microns thick of a non-crystalline (i.e. amorphous) polyester which was an 80:20 copolymer of ethylene terephthalate and ethylene isophthalate with a softening point below 150° C. and a melting point of 210° C., and an intrinsic viscosity between 0.6 and 0.7, and an outer layer (A2) 12 microns thick of biaxially oriented polyethylene terephthalate. This outer layer did not bond with the polypropylene material of the closure during the injection moulding operation.

In a second specific example (2), an aluminium can end of substrate metal alloy 5182 0.33 mm thick was provided with a polypropylene closure 18 and an internal coating 14 similar to that of the previous example, except that the polypropylene layer (B2) was 18 microns thick, and with a coating 17 on its upper side similar in all respects to the coating 17 of the previous example.

In a third specific example (3) an ECCS can end of substrate metal thickness 0.24 mm was provided with a polypropylene closure 18 and an internal coating 14 similar to that in the previous example (2) and with a white coating 17 on its upper side comprising layers of:

(a) an innermost layer (A1) in contact with the metal of a maleic anhydride graft-modified polypropylene diluted with a random ethylene propylene copolymer to a concentration of 0.2+0.05%; layer thickness 3 microns (b) a layer (A2) of polypropylene pigmented with 20% by weight titanium dioxide, containing magenta toner and carbon black opacifier; layer thickness 29 microns (c) a second layer (A3) of resin, as inner layer (A1) above; 3 microns thick (d) an outer layer (A4) of titanium dioxide (7% by weight) pigmented Nylon 6; layer thickness 5 microns.

In a fourth specific example (4) an ECCS can end of metal substrate thickness 0.24 mm was provided with a polypropylene closure 18 and an internal coating 14 similar to that in previous example (1) and with a white coating 17 on its upper side comprising layers of:

(a) an innermost layer (A1) in contact with the metal of a maleic anhydride graft modified polypropylene diluted with a random ethylene propylene copolymer to a concentration of 0.2+0.05%, layer thickness 3 microns (b) a layer (A2) of titanium dioxide pigmented (20%) polypropylene containing toner and opacifier; layer thickness 31 microns (c) a layer (A4) of titanium dioxide pigmented (7%) polypropylene; six microns in thickness and corona treated on the surface.

(d) an outer layer (A5) of nitrocellulose lacquer 2 microns thick applied to the polypropylene film before lamination to the steel.

In a fifth specific example (5) the metal and film structure was identical to example (3) except that the outer layer (A4) contained polymethyl pentene and no nylon 6.

In the foregoing examples, the polymer films A and B were laminated simultaneously to the metal strip as follows:

1. The metal strip was heated, by either induction heating or infra red means, to 155° C. (Examples 1, 3, 4 and 5) or 140° C. (Example 2).

2. Films A and B were applied simultaneously to the heated strip via a pair of lamination nip rolls.

3. The laminate was reheated by induction or infrared means to a temperature of approximately 250° C.

4. After two seconds the strip was quenched rapidly and uniformly with cold water.

5. The strip was dried using squeegee rollers and air knives.

In all these examples, the coatings 14,17 had thus been laminated to the metal sheet simultaneously, before formation of the can end. They were found to give good protection to the metal against corrosion and the effects of double seaming as well as protection of the can contents against iron ingress in the first, third fourth and fifth examples and aluminium ingress in the second example and absence of bonding of the pull tab to the coating of the upper surface in all cases, rendering opening of the closure easy.

We claim:

1. A metal can end having a central panel with an aperture therein and a one-piece tear-open closure of a polymeric material moulded on to the central panel, the closure comprising a plug part filling the aperture, a rim surrounding the aperture at least on the under side of the central panel and a pull tab joined laterally to the plug part and lying against the upper side of the central panel, the can end being provided on its under side with a coating of a polymeric material bonded to the polymeric material of the rim of the closure, characterised in that the can end is provided on its upper side with a coating whose outer surface is of a polymeric material different from the polymeric material of the under side coating and chosen so as not to bond with the polymeric material of the closure but to be capable of being laminated in film form to the metal simultaneously with the polymeric material of the coating on the under side, and to protect the metal of the can end from corrosion and from the effects of double seaming the can end to a can body.

2. A metal can end according to claim 1 characterised in that the closure is of a polyolefin or a polyamide and the coating on the underside is a single-layer film of a bonding resin which is an acid-modified polyolefin resin containing carboxyl or anhydride groups.

3. A metal can end according to claim 1 characterised in that the closure is of a polyolefin or a polyamide and the coating on the under side is a composite film comprising an inner layer of a bonding resin which is an acid-modified polyolefin resin containing carboxyl or anhydride groups and an outer layer of a polyolefin or a polyamide or an acid-modified polyolefin adhered to the inner layer.

4. A metal can end according to claim 3 characterised in that the closure and the outer layer of the film on the underside are of polypropylene, polyethylene or an ethylene-propylene copolymer.

5. A metal can end according to claim 3 characterised in that the closure is of nylon and the outer layer of the film on the underside is of nylon or an acid-modified polyolefin.

6. A metal can end according to claim 3, characterised in that the coating on the upper side of the can end is a composite polyester film comprising an inner layer of a substantially non-crystalline linear polyester having a softening point below 150° C. and a melting point above 150° C. but below 240° C. and an outer layer of a linear polyester having a melting point above 220° C.

7. A metal can end according to claim 6, characterised in that the linear polyester having a melting point above 220° C. is biaxially oriented polyethylene terephalate.

8. A metal can end according to claim 3, characterised in that the coating on the upper side of the can end is a composite film comprising an inner layer of a bonding resin which is an acid-modified polyolefin resin containing carboxyl or anhydride groups and an outer layer of a polymer which does not bond with the polyolefin or polyamide material of the closure.

9. A metal can end according to claim 8 characterised in that a layer of polyolefin overlies the inner layer of bonding resin and a further layer of bonding resin is interposed between said polyolefin layer and an outer layer.

10. A metal can end according to claim 9 characterised in that the closure is of a polyolefin and the polymer of the outer layer is a polyamide.

11. A metal can end according to claim 9 characterised in that the polymer of the outer layer is polymethylpentene.

12. A metal can end according to claim 9 characterised in that the polymer of the outer layer is a polycarbonate.

13. A metal can end according to claim 9 characterised in that the polyolefin layer overlying the inner layer and/or the outer layer incorporates one or more pigments.

14. A metal can end according to claim 13 characterised in that the outer layer incorporates a synthetic silica with a mean particle size between 2 and 4 microns as a pigment.

15. A metal can end according to claim 13 characterised in that the pigment or one of the pigments is titanium dioxide.

16. A metal can end according to claim 8 characterised in that the polymer of the outer layer is polypropylene which has been subjected to corona treatment and then covered by a liquid-applied coating which does not bond with the polyolefin or polyamide material of the closure.

17. A metal can end according to claim 16 characterised in that the liquid-applied coating is of polyvinylidenechloride, nitrocellulose or an acrylic lacquer.

18. A metal can end according to claim 1 characterised in that the metal of the can end is electrolytically chromium coated steel, low tin tinplate or aluminium.

* * * * *